United States Patent

Droste

[11] Patent Number: 5,598,662
[45] Date of Patent: Feb. 4, 1997

[54] POLE GARDEN AND FOUNTAIN

[76] Inventor: Donna A. Droste, 1101-1A Old Buckingham Dr., Midlothian, Va. 23113

[21] Appl. No.: 607,040

[22] Filed: Feb. 26, 1996

[51] Int. Cl.⁶ .................................................. A47G 7/00
[52] U.S. Cl. ..................................................... 47/39; 47/62
[58] Field of Search ............................ 47/39, 39 C, 39 P, 47/62

[56] References Cited

U.S. PATENT DOCUMENTS

| | | | |
|---|---|---|---|
| 217,010 | 7/1879 | Judson et al. | 47/39 C |
| 422,297 | 2/1890 | Covington | 47/39 |
| 554,661 | 2/1896 | Doolittle | 47/39 |
| 2,003,986 | 6/1935 | Witthuhn | 47/39 P |
| 4,951,416 | 8/1990 | Gutridge | 47/39 C |
| 5,502,922 | 4/1996 | Shlomo | 47/39 |

FOREIGN PATENT DOCUMENTS

| | | | |
|---|---|---|---|
| 2558957 | 7/1976 | Germany | 47/39 C |
| 3431438 | 2/1986 | Germany | 47/39 C |
| 168677 | 4/1934 | Switzerland | 47/39 |
| 47788 | 4/1966 | U.S.S.R. | 47/39 |

*Primary Examiner*—Terry Lee Melius
*Assistant Examiner*—Joanne C. Downs
*Attorney, Agent, or Firm*—David H. Semmes

[57] ABSTRACT

A pole garden and fountain, characterized by at least one floor to ceiling stabilizing pole, supporting adjustable couplings for plant potting dish hangers and circulating water dish troughs, each of which may be independently rotated and/or elevated to a preselected position. A fountain effect is obtained by recycling water from a base water well to a topmost feeder water dish trough. Corresponding dishes are artistically disposed upon the pole in coactive water circulating array. The stabilizing pole is adjustable and the unit is readily portable. Stability to the pole is achieved through foot and ceiling mounting brackets upon which respective feeder water dish and plant potting hanger dishes are mounted.

1 Claim, 2 Drawing Sheets

POLE GARDEN AND FOUNTAIN

BACKGROUND OF THE INVENTION

The invention is characterized by a floor to ceiling stabilizing pole, supporting adjustable couplings for plant potting hangers, and circulating water dish troughs, each of which may be independently rotated to a selected artistic position. A fountain effect is obtained by recycling water from the base water well to a topmost feeder water dish. The stabilizing pole is adjustable and the unit is readily portable. Stability to the pole is achieved through foot and ceiling mounting brackets upon which the respective fountain and plant potting elements are coactively disposed.

INFORMATION DISCLOSURE 37 CFR CH.1§1.97

The description of the prior art is best represented by the following United States Letters Patent.

| INVENTOR | DATE | U.S. PAT. NO. | DESCRIPTION |
| --- | --- | --- | --- |
| Nign | 1959 | Des. 185,946 | Fountain |
| Zysk | 1964 | 3,286,927 | Ornamental Fountains |
| Hibben | 1969 | Des. 213,692 | Fountain |
| Hibben | 1969 | Des. 213,693 | Fountain |
| McCarthy | 1978 | 4,068,761 | Apparatus for Supporting and Displaying Plants |
| Watkins | 1980 | 4,202,056 | Toilet Waterfall |

From an examination of the aforementioned it occurs that the invention hereunder is distinct over the art as evidenced by a close examination of the ensuing description, drawings and claims. Among the outstanding distinctions, relative to the art, are the following. The present pole garden fountain mounts potting and fountain dishes that may be selectively rotated 360° around an upstanding pole. By virtue of its stability, the pole is capable of supporting the weight of plant and water receptacles wherein water conduits may be positioned from one hanger dish to another, below. Likewise, couplings and support rods for the spaced apart dishes will support either hangers for plants or water dishes. See Des. Pat. 185,946 of Nign. In contrast to Zysk, U.S. Pat. No. 3,286,927, a sealed pump unit is operative in connection with the water well at the base of the unit, the water being pumped through a hose from the water well up the pole and out to feed a single flow distributor dish. Circulation of water to and through fountain elements is virtually continuous. Distinguishing over Des. Patent Nos. 213,692 and 213,693 of Hibben, the receptacle dishes in the present invention are not attached to the pole but rather to universally adjustable brackets, one for each retainer dish. Likewise, respective dishes may be rotated within the hanger, whereby water may be fed to either side of the pole hanger to the retainer dish below. The aforesaid distinctions apply as well to McCarthy, U.S. Pat. No. 4,068,761 which defines a substantially fixed set of plant hangers which may not be handily rotated laterally, relative to the upright post member. See also, in this connection, Watkins, U.S. Pat. No. 4,202,056, illustrating comparatively fixed drip pans set in a permanent staggered and superposed relation.

DESCRIPTION OF PREFERRED EMBODIMENTS

Figure 1:
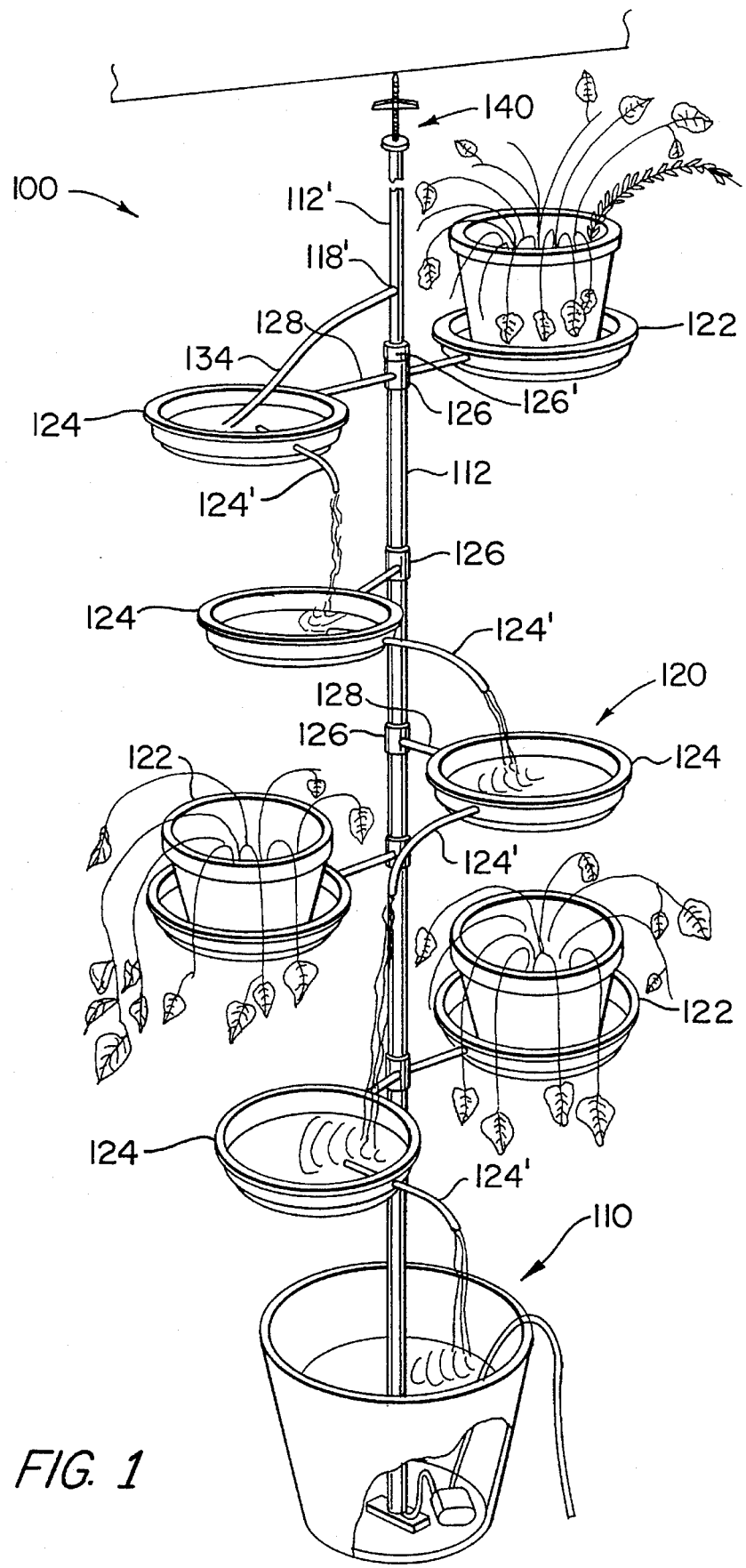
FIG. 1 is a view in perspective of the overall invention in its operative configuration.
Figure 2:
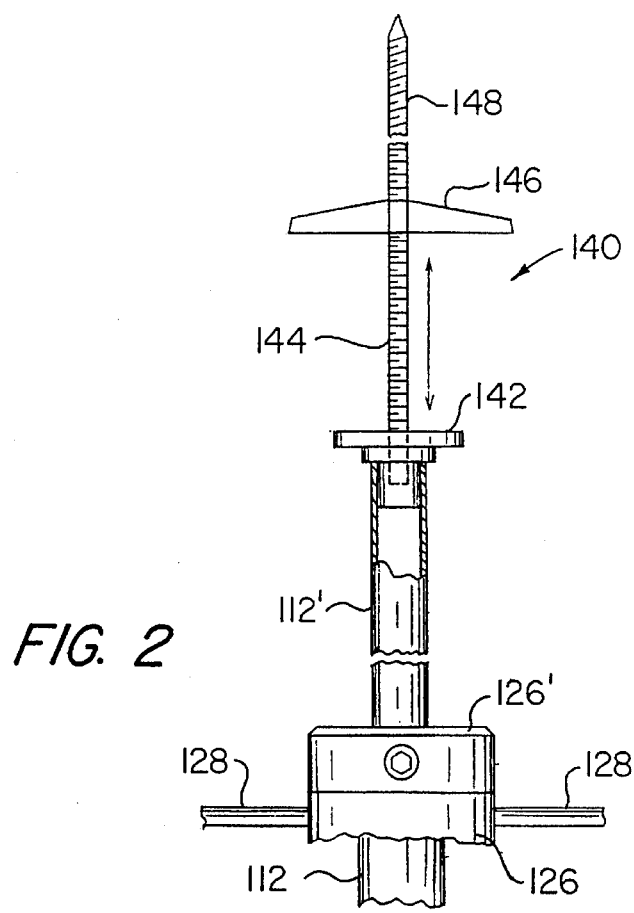
FIG. 2 is an enlarged view in section detail of the ceiling mounting bracket relative to a ceiling joist.
Figure 3:
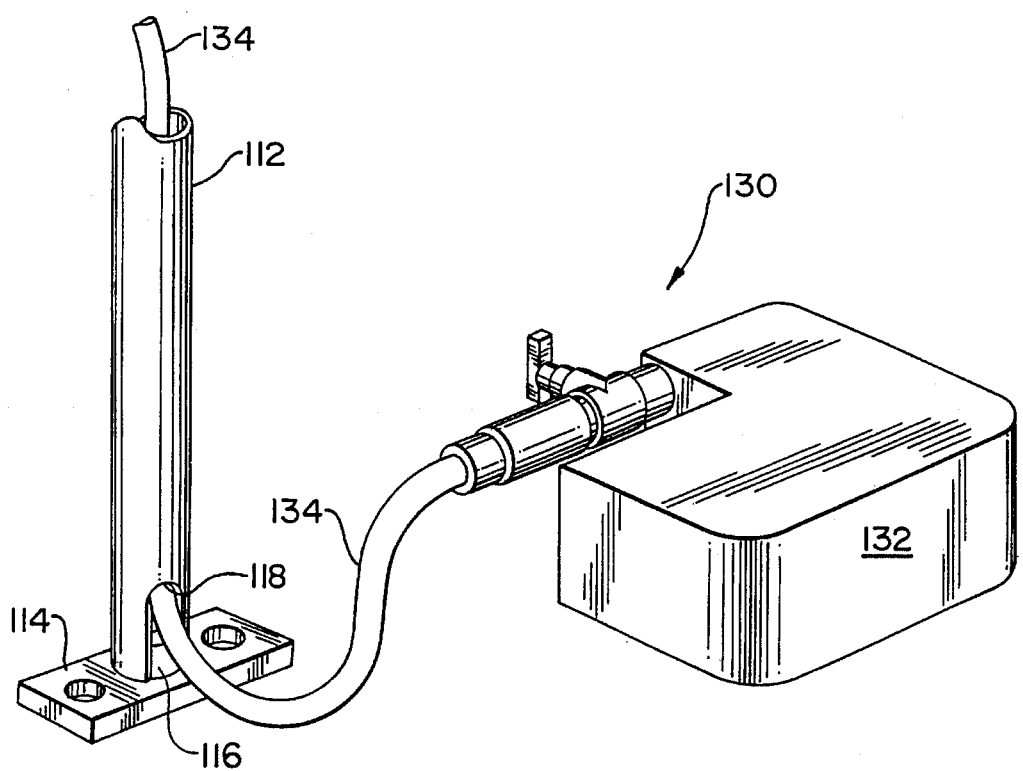
FIG. 3 is an enlarged view of a lower segment of the supporting pole and its circulator.

Referring to FIG. 1, the pole fountain garden 100 comprises in coactive relationship a water well 110 which is base supportive of plant hanger and water dish assembly 120, the respective elements and mounts being served by the water circulator pump 130 and associated water conductive elements.

Water well 110 provides a base reservoir which is operatively retentive of ¾" EMT tubing hanger pole 112 and its ½" EMT tubing extension 112'. At the top, the pole 112 and its extension 112' are anchored against movement by ceiling bracket assembly 140. In practice, the overall height of the supporting pole 112 and its extension 112' is determined by the disposition of the set collar 126' which is compressed by a set screw against smaller extension pole 112', approximately 5½ feet from the floor, the height of the larger pole. When secured by the set screw, the set collar 126' prevents the smaller tubing extension 112' from sliding inside larger tubing 112, thus setting the desired height of the overall supporting pole assembly. Ceiling mounting bracket 140 connects via plug 142 to tubing extension 112'; the plug being threaded will provide fine vertical adjustment for the mounting screw 144. Screw 144 bears lateral butterfly extensions 146 for turning the stud mounting spike 148 into registry with a stud or ceiling joist.

The pole assembly has a stabilizing foot bracket 114 at its lowermost end. Bracket 114 has a pressed nipple 116, the function thereof being to steady the pole assembly 112/112' against displacement. A suitable port 118 is bored therein for entry of a water circulating tube, hereinafter defined with respect to the water circulator pump. A corresponding aperture 118' is disposed in the upper region of the hollow tubular pole 112 for exit of a single flow water circulating tube 134.

The assembly 120 comprises plant dishes 122 and water dishes 124, each being appropriately mounted and compression locked by vertically shiftable and rotatable couplings 126, each of which has releasable lock means, viz threaded detent. Each coupling also bears threadedly removable rod and dish retainers 128. As will appear, the couplings 126 permit not only rotational but vertical movement for variation in artistic adjustment to the respective plant dish 122 and water dishes 124, as is apparent from the drawings. Parenthetically, each of the water dishes is provided with a ¼" feed flow tube 124' such that by manipulation of the coupling 126 and its friction locking relation to pole 112, water flowing from the respective superposed water dishes 124 may be attractively positioned and repositioned for garden enhancement and effect. See FIG. 1.

Water is circulated for the fountain effect and/or for preselected hydroponic plants by means of the water circulator system 130 consisting of the water circulator pump 132, appropriately powered electrically. The single flow circulatory tube 134 enters pole 112 at its bottom aperture 118, passing upwardly through the pole to an exit orifice 118' adjacent the uppermost regions of the pole 112 to feed, via tube 134 the uppermost disposed water dish 124. The water dishes 124 each secure feed flow tubes, which are appropriately bent for spill-over fountain effect. Respective water and plant dishes are artistically retained about the hanger pole 112, as shown in FIG. 1.

The aforesaid invention is restricted in its scope only by the annexed claims, wherein I claim:

1. A pole garden and fountain assembly mountable between a floor and a ceiling, comprising in combination:
   a) a base water well (110) forming a reservoir for continuously supplying water through a hanger pole;
   b) a hollow hanger pole (112), said hanger pole being stabilized upright against displacement by a foot bracket (114) and a ceiling joist mounting bracket (140); an extension pole (112') adjustably secured within the hanger pole (112), the ceiling joist mounting bracket (140) threadingly engaging the extension pole (112') in vertical elongation thereof, said ceiling joist mounting bracket (140) defining a mounting screw (144) upon a plug (142), whereby upon turning a butterfly extension (146) of a stud mounting spike (148), the ceiling joist mounting bracket may be forced into and out of registry with a ceiling joist;
   c) a plant dish and water dish assembly (120) mounted upon the hanger pole (112), said assembly including plant dishes (122) and water dishes (124); vertically adjustable pole couplings (126) for the respective plant and water dishes, with rod and dish retainers (128) threadingly engaging the couplings (126) to thereby space the dishes transversely from the hanger pole (112); a water transfer conduit (124') spaced above a bottom of each said water dish (124) and extending from the interior of each water dish (124) in spill-over transfer relationship to a succeeding water dish, said plant and water dishes being arranged vertically about said hanger pole such that plant dishes alternate with water dishes in a decorative fashion, said plant dishes having no water transfer conduits associated therewith; and
   d) a water circulator (130) comprising a water circulating pump (132), said pump having an output connection with a single-flow water tube (134), said tube passing upward through the pole extension (112') and outwardly thereof for continuous supply and recirculation of water to at least one of the respective water dishes (124).

* * * * *